United States Patent
Mazariegos et al.

(10) Patent No.: US 9,705,598 B2
(45) Date of Patent: Jul. 11, 2017

(54) METHODS AND SYSTEMS FOR REDUCING OPTICAL BEAT INTERFERENCE VIA POLARIZATION DIVERSITY IN FTTX NETWORKS

(71) Applicant: CommScope, Inc. of North Carolina, Hickory, NC (US)

(72) Inventors: J. Roberto Mazariegos, Denver, NC (US); Mark O. Vogel, Statesville, NC (US); Mark E. Alrutz, Taylorsville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/678,192

(22) Filed: Apr. 3, 2015

(65) Prior Publication Data

US 2015/0288451 A1 Oct. 8, 2015

Related U.S. Application Data

(60) Provisional application No. 61/974,884, filed on Apr. 3, 2014.

(51) Int. Cl.
| | |
|---|---|
| *H04B 10/2507* | (2013.01) |
| *H04J 14/06* | (2006.01) |
| *H04B 10/2575* | (2013.01) |
| *H04B 10/572* | (2013.01) |
| *H04B 10/2543* | (2013.01) |
| *H04B 10/532* | (2013.01) |

(52) U.S. Cl.
CPC ..... *H04B 10/2507* (2013.01); *H04B 10/2543* (2013.01); *H04B 10/25751* (2013.01); *H04B 10/532* (2013.01); *H04B 10/572* (2013.01); *H04J 14/06* (2013.01)

(58) Field of Classification Search
CPC ............ H04B 10/2504; H04B 10/2507; H04B 10/25073; H04B 10/2543–10/2563; H04B 10/2575; H04B 10/25751; H04B 10/572; H04J 14/02–14/0205; H04J 14/0224; H04J 14/0298; H04J 14/06; H04J 14/08
USPC ..... 398/58, 65–68, 76–79, 82, 98, 152, 153, 398/184, 192, 195
See application file for complete search history.

(56) References Cited

U.S. PATENT DOCUMENTS

| | | | | |
|---|---|---|---|---|
| 5,574,553 | A * | 11/1996 | McManamon | H04B 10/61 356/28.5 |
| 5,841,557 | A * | 11/1998 | Otsuka | H04B 10/2557 398/152 |
| 5,850,303 | A * | 12/1998 | Yamamoto | H04B 10/504 398/76 |
| 5,920,413 | A * | 7/1999 | Miyakawa | H04J 14/0201 385/24 |

(Continued)

FOREIGN PATENT DOCUMENTS

| | | | | |
|---|---|---|---|---|
| JP | 06177840 | A * | 6/1994 | H04B 10/18 |
| JP | 11068702 | | * 3/1999 | H04J 14/00 |

*Primary Examiner* — Li Liu

(74) *Attorney, Agent, or Firm* — Merchant & Gould P.C.

(57) ABSTRACT

Methods of reducing optical beat interference in a fiber optic network are provided. The optical fiber network may have a plurality of optical network units that communicate with a shared receiver. The optical signals that are transmitted from the optical network units to the receiver may have polarization states that are selected to reduce optical beat interference at the receiver.

9 Claims, 2 Drawing Sheets

(56) References Cited

U.S. PATENT DOCUMENTS

| | | | | |
|---|---|---|---|---|
| 6,038,357 A * | 3/2000 | Pan | H04J 14/02 | 385/11 |
| 6,134,033 A * | 10/2000 | Bergano | H04B 10/2507 | 398/1 |
| 6,185,232 B1 * | 2/2001 | Hess, Jr. | H01S 5/0612 | 372/102 |
| 6,236,480 B1 * | 5/2001 | Atlas | H04B 10/2537 | 398/9 |
| 6,459,515 B1 * | 10/2002 | Bergano | H04J 14/02 | 398/79 |
| 6,738,181 B1 * | 5/2004 | Nakamoto | H04B 10/2525 | 359/337 |
| 6,904,240 B1 * | 6/2005 | Suga | H04J 14/06 | 398/79 |
| 7,366,209 B2 * | 4/2008 | Sato | H04B 10/2525 | 370/203 |
| 7,447,436 B2 * | 11/2008 | Yee | H04B 10/50 | 398/152 |
| 7,515,830 B2 * | 4/2009 | Jang | H04J 14/02 | 398/196 |
| 7,542,634 B1 * | 6/2009 | Meli | G02B 6/12019 | 385/24 |
| 8,295,704 B2 | 10/2012 | Vogel | | |
| 8,488,974 B2 * | 7/2013 | Agmon | H04B 10/272 | 398/152 |
| 2002/0167705 A1 * | 11/2002 | Shimizu | H04B 10/504 | 398/182 |
| 2004/0008995 A1 * | 1/2004 | Ono | H04B 10/572 | 398/182 |
| 2004/0131089 A1 * | 7/2004 | Uemura | H04J 3/047 | 370/537 |
| 2004/0240505 A1 * | 12/2004 | Yoshida | B82Y 20/00 | 372/50.1 |
| 2005/0111849 A1 * | 5/2005 | Merlaud | H04J 14/02 | 398/152 |
| 2007/0122153 A1 * | 5/2007 | Tamai | H04J 14/005 | 398/77 |
| 2007/0253662 A1 * | 11/2007 | Patel | G01M 11/39 | 385/13 |
| 2008/0030839 A1 * | 2/2008 | Yao | G02F 1/0136 | 359/281 |
| 2009/0097856 A1 * | 4/2009 | Sasai | H04B 10/1141 | 398/119 |
| 2009/0317091 A1 * | 12/2009 | Vogel | H01S 5/0612 | 398/200 |
| 2013/0216228 A1 * | 8/2013 | Nazarathy | H04B 10/272 | 398/65 |
| 2014/0064728 A1 * | 3/2014 | Atlas | H04B 10/2507 | 398/65 |

* cited by examiner

METHODS AND SYSTEMS FOR REDUCING OPTICAL BEAT INTERFERENCE VIA POLARIZATION DIVERSITY IN FTTX NETWORKS

CROSS-REFERENCE TO RELATED APPLICATION

The present application claims priority under 35 U.S.C. §119 to U.S. Provisional Patent Application Ser. No. 61/974,884, filed Apr. 3, 2014, the entire content of which is incorporated herein by reference as if set forth in its entirety.

FIELD OF THE INVENTION

The present invention generally relates to fiber optic networks and, more particularly, to fiber optic networks that have multiple lasers transmitting optical signals to a common receiver within a potentially overlapping wavelength range.

BACKGROUND

A cable television network is a well-known type of communications network that is used to transmit cable television signals and/or other information between one or more service providers and a plurality of subscribers over coaxial cables and/or fiber optic cables. Most conventional cable television networks comprise hybrid fiber-coaxial ("HFC") networks. In these networks, fiber optic cables are typically used to carry signals from the headend facilities of the service provider to various distribution points, while less expensive coaxial cable may be used, for example, to carry the signals into neighborhoods and/or into individual customer premises. In many cases, the proportion of an HFC network that comprises fiber optic cables is increasing. For example, many HFC networks are now implemented as Fiber-to-the Curb ("FTTC") or as Fiber-to-the-Home ("FTTH") networks, where the fiber optic portion of the network may extend down residential streets in the network (in FTTC applications) or all the way to individual customer premises (in FTTH) applications. FTTC, FTTH and other fiber-heavy HTC networks may be referred to generically as "FTTx networks."

Typically, the service provider is a cable television company that may have exclusive rights to offer cable television services in a particular geographic area. The subscribers in a cable television network typically pay the service provider to deliver various services to the "customer premises" which may include, for example, individual homes, apartments, hotels, businesses, etc. The subscribers may include, for example, individual homes, apartments, hotels, etc., and various businesses and other entities. The services offered by the cable television service provider may include, for example, broadcast cable television service, broadband Internet connectivity and/or Voice-over-Internet Protocol ("VoIP") digital telephone service. These services involve transmitting various content between the service provider and the customer premises that are delivered to the customer premises as radio frequency ("RF") signals.

RF over Glass ("RFoG") networks are a particular type of FTTx network. In an RFoG network, fiber optic cables are used to carry, RF signals that are modulated onto laser beams for transport over the fiber optic network infrastructure. One advantage of such systems is that the network infrastructure is transparent to the RF signals, and this allows cable television network operators to continue to use the same customer premise equipment that is used in conventional HFC networks. This customer premise equipment includes set-top boxes, DOCSIScable modems, and DOCSISVoIP modems, all of which are in wide use today, In RF-based FTTx systems, a network interface unit is placed at (or near) each customer premise. These network interface units are commonly referred to as RFoG optical network units or "RONUs." Each customer premise equipment device (e.g., a set-top box, a DOCSIScable modem and a DOCSIS VoIP modem) is connected to the RONU. Each RONU contains a laser that is used to transmit the upstream signals from the customer premise to the head end facilities of the cable television network operator. The laser utilizes burst mode transmission in the upstream direction and is inactive until an RF signal is generated by one of the customer premise equipment devices and transmitted to the RONU over a wired or wireless RF connection. When the RF signal (which may be modified before reaching the laser) reaches the upstream laser, it activates the laser by directly modulating the optical output of the laser. When the RF burst ends, the laser in the RONU returns to its inactive state. Equipment at the head end facilities of the RFoG network may control the customer premise equipment devices so that only one device will transmit signals on a given channel at any given time.

In a typical RFoG network, each optical fiber serves up to thirty two customers. Thus, equipment at up to thirty-two different customer premises may all communicate over the same optical fiber. At the cable television service provider head end unit, the optical fiber is connected to a transmitter and a receiver via a wave division multiplexing unit.

Conventionally, cable television networks operating under a DOCSIS protocol transmit all of the upstream communications at a common frequency (e.g., 15 MHz) using a time division multiple access ("TDMA") scheme. Equipment at the head end facilities would control the customer premise equipment to only transmit upstream signals in pre-assigned time slots. However, under the latest version of the DOCSIS® protocol (DOCSIS® 3.1) that is used with respect to RFoG networks, the upstream RF channel may be divided into hundreds of independent sub-channels based on frequency so that upstream signals are now transmitted using a TDMA/frequency division multiple access ("FDMA") scheme. While the signals transmitted by two different customer premise equipment devices in the same time slot will be separated by frequency in the RF domain, this will not be true in the optical domain since each RF signal is used to modulate a laser that transmits optical signals at the same nominal wavelength.

The RONU at each customer premise may have a dedicated FDMA/TDMA upstream sub-channel that carries upstream communications between the RONU and the head end unit. This sub-channel is defined by a frequency band in which the RF signal is located and a time slot within the frequency band during which the RF signal is transmitted. While the customer premise equipment devices connected to the RONU at any particular customer premise may be active (i.e., transmitting) at the same time (on different FDMA channels), they are used to modulate the same laser so both RF signals are carried within the same optical signal and optical interference is avoided. However, since multiple RONUs (e.g., 32) transmit upstream signals over the same optical fiber to the headend facilities, it is possible that multiple of the RONUs that are connected to a given optical fiber may be transmitting optical signals to the head end facilities at the same time (i.e., in the same time slot) but at different RF frequencies. For example, a first RONU may be transmitting a signal from a cable modem operating on a first FDMA sub-channel in a particular time slot, while a second RONU is transmitting a signal during the same time slot from a cable modem, set-top-box or the like operating on a second FDMA sub-channel. In this case there will be an optical collision at the upstream receiver at the head end unit since two RF modulated optical signals that are at the same wavelength will arrive at the receiver simultaneously.

In an RFoG system, the lasers in the RONUs are typically designed to transmit optical signals at the same nominal wavelength (typically either 1310 nm or 1610 nm), which is why the above-described optical collisions may occur. However, some variation in the actual transmission wavelength is expected due to manufacturing variation and operating temperature. Thus, the lasers of the RONUs used in a particular network may have center wavelengths that fall within a narrow wavelength range at a specified temperature, such as, for example, 1610 nm +/−1.5 nm at 25° C. While the line width of the optical signals may vary, they typically are much smaller than the expected variation in operating wavelength, such as for examples line widths of 0.001 to 0.005 nm. Accordingly, even though the lasers of two different RONUs may be transmitting signals to the same receiver in the same time slot at the same nominal wavelength, the optical signals may not overlap because the actual center wavelengths of the two lasers may be separated by an amount that is greater than the line widths of the optical signals. If two optical signals are transmitted at the same time over the same optical fiber and the operating wavelengths of the two lasers do not significantly overlap, the result of the optical collision may cause some degradation in optical link performance, but this degradation can typically be handled by link margins that are present in the system.

However, it is also inevitably the case in an RFoG network that there will be instances where multiple lasers transmit signals in the same time slot at wavelengths that partially or even completely overlap. When this occurs, the optical signals interact in the optical receiver, which results in the generation of a noise product that is generally referred to as Optical beat interference. Optical beat interference is a wideband noise having a generally uniform magnitude that may appear, for example, as an increase in the noise floor. The greater the overlap in the wavelengths of the two "colliding" optical signals, the greater the increase in the magnitude of the optical beat interference. Since optical beat interference generates a broadband noise, it may degrade all of the carriers in the upstream band, and can prevent the headend control systems for the customer premise equipment from being able to lock onto and demodulate the upstream carriers for the duration of the overlapping bursts. Similar problems will occur in any future burst if two or more RONUs are simultaneously active and their wavelengths significantly overlap. Because of the protocols associated with the customer premise equipment devices, this could knock the devices off of the network and cause them to re-initialize on the network.

One of the difficulties in resolving this problem is that the operating wavelength of a laser is typically dependent on its temperature, and RONUs are often used in an outside plant environment where temperatures can range from −40° C. to 65° C. In addition, one RONU may be in the sun while another is in the shade, and this causes a temperature differential between the two units. The operating wavelength of a laser changes by about 0.1 to 1.0 nm/° C., depending on the design of the laser. Therefore, while a system could be designed to have lasers that transmit at different wavelengths, these wavelengths may change with changing temperature over the course of a day and these changes would not be uniform across all of the lasers. As a result, the operating wavelength (i.e., the wavelength of the optical signal transmitted by the laser) of the laser at a first RONU may partially or even completely overlap with the wavelength of the laser at a second RONU. While the use of thermoelectric coolers at each RONU to control the temperature of the lasers may partially mitigate the problem of temperature variation, such thermoelectric coolers may not be able to compensate for the full range of temperature variation, particularly with respect to RONUs that are located outdoors, and thermo electric coolers also have both an inherent lag time and only limited temperature accuracy. As such, thermo electric coolers have the potential to reduce, but not wholly eliminate, the effects of temperature variation.

One theoretical way of avoiding optical beat interference is to use lasers at the up to thirty-two RONUs that are connected to the same head end unit that have wavelengths that are sufficiently spaced-apart such that the wavelengths of the optical signals transmitted by the lasers will not overlap given the expected variation in wavelength over the expected temperature range. This approach theoretically eliminates wavelength overlap and therefore may prevent optical beat interference from occurring. However, because of the limited tuning range of the lasers (about 3 nm) and the shift in a laser's wavelength that may occur at activation in response to the initial surge of current from a cable modem burst, it may not be possible to deploy lasers that transmit at 32 different wavelengths in a manner that will ensure that no overlap occurs given the expected temperature variation, even when thermoelectric coolers are used to reduce the expected range of temperature variation. Thus, higher costs lasers would typically have to be used, which may not be economically feasible. In addition, this approach further increases the system cost and complexity since the lasers must be sorted into groups that meet the requirements of a particular operating window in a system or be specifically designed and fabricated for each of the wavelengths required, and network operators must stock sets of, for example, thirty-two different RONUs, each of which has a laser transmitting at a different wavelength. This may become difficult to manage when deploying and subsequently maintaining a system. This approach also takes up spectrum on the optical fiber that could be used to support other services.

An alternative approach that eliminates the need for the technician to manage RONUs having lasers that transmit at different wavelengths, and which also may reduce the need for increased spectrum, is to vary the wavelength used by the lasers as described in U.S. Pat. No. 8,295,704 ("the '704 patent"), which is assigned to the assignee of the present application. The entire contents of the '704 patent is incorporated herein by reference as if set forth fully herein. The technique disclosed in the '704 patent varies the wavelength of each RONU in a unique fashion such that the probability of a pair or larger group of RONUs having significantly overlapping wavelengths is significantly reduced. This technique reduces the probability of optical beat interference, but does not eliminate it.

SUMMARY

Pursuant to embodiments of the present invention, methods of reducing optical beat interference in a fiber optic network are provided. The optical fiber network may have a plurality of optical network units that communicate with a shared receiver. According to embodiments of the present invention, the optical signals that are transmitted from the optical network units to the receiver may have polarization states that are selected to reduce optical beat interference at the receiver. It will be appreciated that polarization states are commonly referred to in the industry as "states of polarization" or "SoP." Herein the terms "polarization states" and "states of polarization" are used interchangeably.

In some embodiments, the polarization state of at least one of the optical signals may be set to a polarization state that reduces optical beat interference. For example, a first optical signal may be set to a first polarization state and a second optical signal may be set to a second polarization state that is substantially orthogonal to the first polarization state. The lasers at first and second optical network units that transmit the first and second optical signals may be tuned to a first wavelength. A laser at a third optical network unit that transmits a third optical signal may be tuned to a second wavelength that is different than the first wavelength.

Pursuant to additional embodiments of the present invention, methods of reducing optical beat interference in a fiber optic network are provided. The fiber optic network includes a first optical network unit and a second optical network unit that each communicate with a shared receiver over respective first and second optical transmission paths. Both the first optical transmission path and the second optical transmission path traverse a shared optical fiber. Pursuant to these methods, a first optical signal is transmitted from the first optical network unit to the receiver over the first optical transmission path where the first optical signal has a first polarization state when transmitted over the shared optical fiber. A second optical signal is transmitted from the second optical network unit to the receiver over the second optical transmission path where the second optical signal has a second polarization state when transmitted over the shared optical fiber. The second polarization state is angularly separated from the first polarization state by at least about 120 degrees.

In some embodiments, the first polarization state may be substantially orthogonal to the second polarization state. In other embodiments, the methods may further involve transmitting a third optical signal from a third optical network unit to the receiver over a third optical transmission path that includes the shared optical fiber, where the third optical signal has a third polarization state when transmitted over the shared optical fiber, the third polarization state being angularly separated from both the first polarization state and the second polarization state by at least about 120 degrees.

In some embodiments, the first and second polarization states may be pre-selected in order to reduce optical beat interference. The first and second optical signals may be set to the respective first and second polarization states at an optical splitter.

In some embodiments, a first temperature control system of the first optical network unit may be used to control a temperature of a first laser that is included in the first optical network unit according to a first algorithm, and a second temperature control system of the second optical network unit may be used to control a temperature of a second laser that is included in the second optical network unit according to a second algorithm that is different than the first algorithm. The first algorithm may, for example, set the temperature of the first laser to a first predefined base temperature and the second algorithm may set the temperature of the second laser to a second predefined base temperature that is different than the first base temperature. The first algorithm may further vary the temperature of the first laser about the first predefined base temperature and the second algorithm may further vary the temperature of the second laser about the second predefined base temperature. In some cases, the first algorithm may automatically vary the temperature of the first laser according to a first continuous function and the second algorithm may automatically vary the temperature of the second laser according to a second continuous function that is different Pursuant to further embodiments of the present invention, splitters for an optical network may be provided that include an input port, a plurality of output ports, and a plurality of polarization converters that are associated with respective ones of at least some of the plurality of output ports.

In some embodiments, the polarization converters may comprise a first set of polarization converters that are configured to convert optical signals into a first polarization state and a second set of polarization converters that are configured to convert optical signals into a second polarization state, where the first polarization state is substantially orthogonal to the second polarization state. In other embodiments, the polarization converters may comprise a first set of polarization converters that are configured to convert optical signals into a first polarization state, a second set of polarization converters that are configured to convert optical signals into a second polarization state, and a third set of polarization converters that are configured to convert optical signals into a third polarization state, where the difference in polarization between the first polarization state and the second polarization state is approximately equal to the difference in polarization between the second polarization state and the third polarization state.

DETAILED DESCRIPTION

Figure 1:
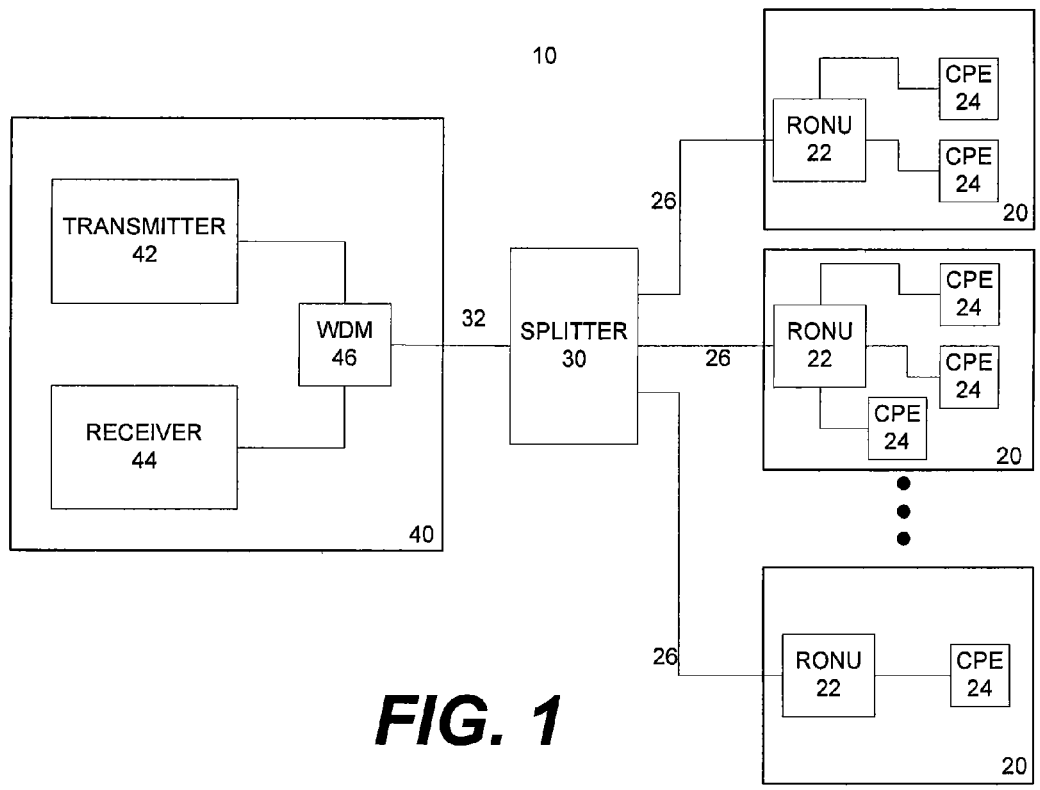
FIG. 1 is a schematic block diagram illustrating a portion of an RFoG network.

Pursuant to embodiments of the present invention, polarization diversity is used to reduce or eliminate optical beat interference at a receiver in a fiber optic network that may simultaneously receive optical signals over a common optical fiber from multiple lasers which may have overlapping transmission wavelengths. An optical signal may have any one of a plurality of states of polarization (also referred to herein as a "polarization state") or may be unpolarized. For any given state of polarization (a first polarization state) that an optical signal may have, there is a second polarization state that is essentially orthogonal to the first polarization state. When two optical signals having such orthogonal polarization states are received at the same time, at the same receiver, virtually no optical beat interference will be generated, even if the two optical signals are at overlapping wavelengths.

In some embodiments of the present invention, the polarization of the optical signals transmitted by the RONUs that are communicating with a common receiver over the same optical fiber may be set or altered in order to reduce the amount of optical beat interference generated at the common receiver. For example, in some embodiments, each of a plurality of RONUs that are communicating with a common receiver may be set to one of two polarization states. The two polarization states may be substantially orthogonal to each other. In such an embodiment, optical beat interference may be reduced by, for example, approximately fifty percent, since when two RONUs transmit in the same time slot at overlapping wavelengths, they will only generate optical beat interference if they have the same polarization state. In further embodiments, more than two polarization states may be used. As optical beat interference that is sufficient to disrupt performance is typically only generated when there is a fair amount of overlap, the use of three, four or more polarization states may result in fewer occurrences of optical beat interference that is sufficient to disrupt system performance.

In further embodiments, the system may be designed so that each RONU transmits an un-polaraized optical signal to the common receiver. When un-polarized optical transmissions from multiple RONUs are received simultaneously at the same receiver, the amount of optical beat interference that is generated may be very small, even if the optical signals are significantly overlapping in wavelength.

In still further embodiments of the present invention, the polarization diversity techniques according to embodiments of the present invention may be combined with the use of lasers having transmission wavelengths that vary as a function of time to reduce optical beat interference. This technique may facilitate designing a system that may exhibit significantly reduced levels of optical beat interference.

Pursuant to some embodiments of the present invention, the polarization state of the optical signals transmitted by the lasers at the RONU may be set or adjusted within the customer premises (e.g., by the lasers, within the RONUs, or external to the RONUs). In other embodiments, the polarization state of the optical signals may adjusted at other points along the optical path including, for example, along the fiber optic cable that connects each RONU to an optical tap/splitter, at the optical tap/splitter, along the fiber optical cable that connects the optical taps/splitter to the optical receiver at the head end unit, or at the head end unit.

Embodiments of the present invention will now be discussed in further detail with reference to the attached drawings.

FIG. 1 is a schematic block diagram illustrating a portion of an RFoG network 10. As shown in FIG. 1, a plurality of customer premises 20 are connected to a head end unit 40 of the RFoG network 10 that may be located, for example, at head end facilities of the cable television service provider. A RONU 22 is located at each customer premise 20. One or more customer premise equipment ("CPE") devices 24 such as set top boxes, cable modems or VoIP modems may be connected to each RONU 22. Each RONU 22 is connected by a fiber optic cable 26 to a splitter/tap unit 30. The splitter/tap unit 30 is connected to the head end unit 40 by another optical fiber 32 or by a network of optical fibers and intervening equipment (not shown). The head end unit 40 may include, among other things, a transmitter 42, a receiver 44 and a wave division multiplexer 46.

The RONU 22 may be an enclosure that houses equipment for converting optical signals on an incoming fiber optic cable into RF signals that can be used by a local network such as, for example, the coaxial cable network within individual customer premise that carries cable signals into individual rooms in the premises. In an RFoG environment, the RONU 22 typically marks the demarcation point between the outside fiber plant that is controlled by the cable television service provider and the customer-owned network wiring. Typical RONUs may include a first input for receiving a fiber optic cable of the RFoG network (i.e., fiber optic cable 26 in FIG. 1) and one or more second inputs for receiving electrical conductors such as coaxial cables. The RONU 22 may also include an optical-to-electrical converter for converting optical signals received on the optical fiber 26 to RF signals that can be transmitted over the electrical conductor(s). The optical-to-electrical converter may comprise, for example, a photodiode that outputs electrical signals in response to received optical signals. The RONU 22 also includes an electrical-to-optical converter in the form of a laser that converts the electrical signals received from the home network into optical signals and transmits these optical signals upstream over the fiber optic cable 26.

The optical splitter/tap 39 may comprise, for example, a 1×N optical splitter/combiner that splits a downstream optical signal that is received from optical fiber 32 N-ways and outputs the split signal onto the N optical fibers 26 for delivery to the RONUs 22 at the customer premises 20. Typically, N will be equal to thirty-two under the RFoG standard ANSI/SCTE 174 2010. The splitter/combiner 30 will likewise combine the upstream optical signals received over the optical fibers 26 into a composite upstream signal and then output that composite upstream signal onto optical fiber 32. The optical splitter/combiner 30 may comprise a passive device. It will be noted that the splitter/combiner 30 may be implemented as multiple smaller splitters (e.g., 1×8 and/or 1×4 splitters). The splitter/combiner 30 could also instead be replaced with one or more tap units.

The wave division multiplexer 46 may receive downstream signals transmitted by the transmitter 42 and output them onto the optical fiber 32 and may also receive the composite upstream signal from optical fiber 32 and output this composite upstream signal to the receiver 44. The upstream and downstream signals are at different wavelengths which allows the wave division multiplexer 46 to correctly route the upstream and downstream signals in this manner.

As discussed above, under the current DOCSIS 3.1 protocol, the customer premise equipment devices 24 that are connected to the RONUs 22 may send RF signals to more than one of the RONUs 22 at the same time. As each RONU 22 uses these RF signals to directly modulate the lasers that are included in the RONUs 22, multiple optical signals may be transmitted, at the same time, from the plurality of RONUs 22 to the optical receiver 44 over the same optical fiber 32. Moreover, since the lasers at the RONUs 22 are all designed to transmit at the same nominal wavelength, such simultaneously transmitted signals may also overlap in wavelength, depending upon the actual nominal center transmission wavelength of each laser and the temperature of the RONUs 22 (which also affects the transmission wavelength). If two optical signals that transmit at the same time also overlap sufficiently in wavelength, then optical beat interference may arise, which may degrade the signal quality or even prevent the head end equipment from maintaining lock on and demodulating the upstream signals during the period of overlap.

Pursuant to embodiments of the present invention, it has been realized that polarization diversity may be used to reduce the occurrence of optical beat interference at the receiver 44. An optical signal may essentially have an infinite number of different polarization states. As is known to those of skill in the art, these different polarization states may be represented by different points on a three-dimensional sphere that is known as the Poincare sphere. If two optical signals that are at identical wavelengths are received at a receiver at the same time, those two signals will generally mix and interfere with each other, generating optical beat interference. However, the degree of mixing will depend on the polarization states of the two signals. If two signals having exactly opposite polarizations are mixed (i.e. the polarization state of the first signal is at coordinates x,y,z on the Poincare sphere and the polarization state of the second signal is at coordinates −x,−y,−z on the Poincare sphere), then theoretically the two signals may be completely orthogonal to each other and no interference (or optical beat interference) will occur. Generally speaking, the closer the polarization states of the two signals on the Poincare sphere the greater will be the extent to which the two signals mix and generate optical beat interference. Herein, the degree to which a first polarization state varies from a second polarization state may be discussed in terms of the angular separation of the two polarization states on the Poincare sphere, where the angular separation refers to the angle defined by the lines extending from the center of the sphere to the points on the surface of the sphere corresponding to the respective first and second polarization states. Thus, for example, if the polarization state of a first signal is at coordinates x,y,z on the Poincare sphere and the polarization state of a second signal is at coordinates −x, −y, −z on the Poincare sphere, the two polarization states would be angularly separated by 180 degrees.

In some embodiments of the present invention, the optical signals that are received at a common receiver may be set or adjusted so that at least some of the optical signals will have polarization states that are different than other of the optical signals that are received at the common receiver. For example, in a first embodiment, a total of thirty-two RONUs 22 may be in optical communication with a common optical receiver 44 over a common optical fiber 32. On sixteen of these RONUs 22 the polarization state of the optical signal transmitted by the lasers thereof may be set to a first state, and the polarization state of the optical signal transmitted by the lasers on the remaining sixteen of the RONUs 22 may be set to a second state that is substantially orthogonal to the first state. It is anticipated that such an arrangement may reduce the occurrence of optical beat interference by about fifty percent.

In other embodiments, more than two separate polarization states may be used. For example, in another embodiment, three polarization states may be chosen that are approximately equidistant from each other on the Poincare sphere. While it is expected that the signals transmitted with these three different polarization states will not be orthogonal to each other, they will exhibit lower degrees of mixing and hence will generate less optical beat interference than would otherwise be expected. Using this technique, there will be more occurrences where optical beat interference is generated as compared to the two polarization state approach discussed above, but the level of optical beat interference generated in each case is expected to be less. In still other embodiments, four, five or more different polarization states may be used. There may be optimum numbers of polarization states for a given system that minimize the overall impact of optical beat interference on system performance.

Typically, margins are built into each communication path between a RONU 22 and the receiver 44 at the head end facilities 40. Additionally, the use of error correction coding and interleaving provides an ability to spread out the bit errors that may occur as a result of optical beat interference and to correct some level of such errors. Accordingly, some level of optical beat interference can typically occur without disrupting the communications between the RONU 22 and the receiver 44. When all thirty-two lasers transmit at one of two orthogonal polarization states, the result is that two lasers that are transmitting at the same time at the exact same wavelength will, theoretically, either completely interfere with each other (if the two laser have the same polarization state), resulting in very high levels of optical beat interference, or not interfere with each other at all (if the two lasers have different polarization states). In contrast, if a larger number of polarization states are used that are only partially orthogonal to each other, then there will be more instances when optical beat interference arises, but the magnitude of the optical beat interference will, on average be less. Since such smaller amounts of optical beat interference often are insufficient to disrupt the communications link for the reasons set forth above, the use of more than two polarization states may be advantageous in some embodiments.

According to still further embodiments of the present invention, the optical signals that are generated by the lasers at the RONUs 22 may be un-polarized optical signals or may be converted into un-polarized optical signals. It is believed that when two un-polarized optical signals at the same wavelength are received at the same time at a receiver, the amount of optical beat interference generated may be less than the amount that would otherwise be generated with two optical signals that are both polarized. Accordingly, in these embodiments the lasers in the RONUs 22 could be designed to emit un-polarized optical signals or, alternatively, de-polarization mechanisms or filters could be installed between the RONUs 22 and, for example, the optical fiber 32 or the splitter/combiner 30. These de-polarization mechanisms or filters may be used to convert each optical signal to an un-polarized state.

As noted above, an alternative approach for reducing optical beat interference is to use lasers at the RONUs that transmit at different optical wavelengths, where the wavelengths are selected so that it is less likely that two optical signals having overlapping wavelengths will arrive at the receiver 44 at the same time, taking into account, for example, variations in the transmission wavelengths that naturally occur with temperature. Pursuant to still further embodiments of the present invention, this approach can be combined with the polarization diversity approach that is discussed above.

For example, in one such embodiment, each laser may transmit optical signals having a first polarization state or a second polarization state that is orthogonal to the first polarization state (or, alternatively, the optical signals that are transmitted by the lasers may be converted to either the first or second polarization state elsewhere along the optical links). Assuming that thirty-two RONUs 22 will communicate with a common receiver 44, the laser of each RONUs 22 may be designed to transmit an optical signal at a selected one of sixteen different wavelengths, with two lasers set to each of the sixteen different wavelengths. For each of these sixteen wavelengths, one of the two lasers may be designed to transmit optical signals having the first polarization state, and the other laser may be designed to transmit optical signals having the second (orthogonal) polarization state. Typically, it is only possible to tune the wavelengths of lower cost lasers by, for example, about +/−3.5 nm. This means that if thirty-two lasers are to be separated at even wavelength intervals, each laser will be tuned to a wavelength that is 0.25 nm from the nominal operating wavelength of at least one other laser. Since each change in temperature of 1° C. may result in a change in the operating wavelength of about 0.1 nm, even relatively small changes in temperature may result in two lasers transmitting at the same nominal wavelength. In the approach described above, the use of two orthogonal polarization states may allow the lasers to be assigned to sixteen different wavelengths, which would increase the separation between adjacent transmission wavelengths to 0.5 nm. Thus, a temperature change of 5° C. (9° F.) would be required to change the operating wavelength of a first laser to fall at the same wavelength as another of the lasers that has the same polarization state. As each laser may have a thermoelectric cooler that is designed to control the temperature of the laser, it may be possible to control the temperature of most lasers to stay within, for example, 4° C. of a pre-selected temperature, and hence the use of polarization diversity may make it possible to use the technique of using lasers that are tuned to different wavelengths as a means of mitigating optical beat interference.

As discussed above, it is also possible to use more than two different polarization states. Thus, as another example, the laser of each RONU 22 may be designed to transmit an optical signal at a selected one of eight different wavelengths, with four lasers set to each of the eight different wavelengths. The four lasers that are tuned to transmit at each of these eight wavelengths may be set to a different one of the four polarization states. Assuming that the lasers can be tuned to a wavelength of about +/−3.5 nm from a nominal wavelength, this means that each laser may be tuned to a wavelength that is 1.0 nm from the operating wavelength of the closest lasers. For a 1610 nm system, the thirty-two lasers might be tuned, for example, so that four lasers transmit at each of the following wavelengths at room temperature: 1606.5 nm, 1607.5 nm, 1608.5 nm, 1609.5 nm, 1610.5 nm, 1611.5 nm, 1612.5 nm and 1613.5 nm. The four lasers that transmit at each of these wavelengths would be set to one of four polarization states, where each of the four polarization states are angularly separated from the other polarization states by approximately ninety degrees. In such a system, it would take a temperature change of 10° C. (18° F.) to change the operating wavelength of a laser that transmits at a first of the eight wavelengths to fall at the same wavelength as another of the lasers that has the same polarization state. In this approach there must be sufficient link margin to handle the optical beat interference that will arise between lasers that are assigned to the same wavelength, since the polarization diversity will only partially mitigate the optical beat interference that arises between such lasers.

It will further be appreciated that the polarization diversity techniques disclosed herein may be combined with the wavelength variation approach described in the aforementioned '704 patent pursuant to reduce the effects of optical beat interference even further. For example, in some embodiments, sixteen of the thirty-two lasers that transmit over a common optical fiber are set to a first polarization state and the other sixteen lasers are set to a second polarization state that is orthogonal to the first polarization state. Any of the techniques for reducing optical beat interference that are disclosed in the '704 patent may then be used, and the polarization diversity may further reduce the amount of optical beat interference that arises. It will likewise be appreciated that the lasers may be equally divided among more than two polarization states. For example, four polarization states may be selected that are angularly separated by approximately 90 degrees apart from each other on the Poincare sphere, and eight lasers may be assigned to each of these four polarization states.

U.S. patent application Ser. No. 14/672,263 ("the '263 application"), filed Mar. 30, 2015, discloses methods of using continuous waveforms to vary the temperature of lasers in order to reduce the amount of optical beat interference in an RFoG system. The '263 application is also incorporated herein by reference in its entirety. Any of the techniques for reducing optical beat interference that are disclosed in the '263 application may similarly be combined with the polarization diversity techniques disclosed herein to further reduce the amount of optical beat interference that arises.

Figure 2:
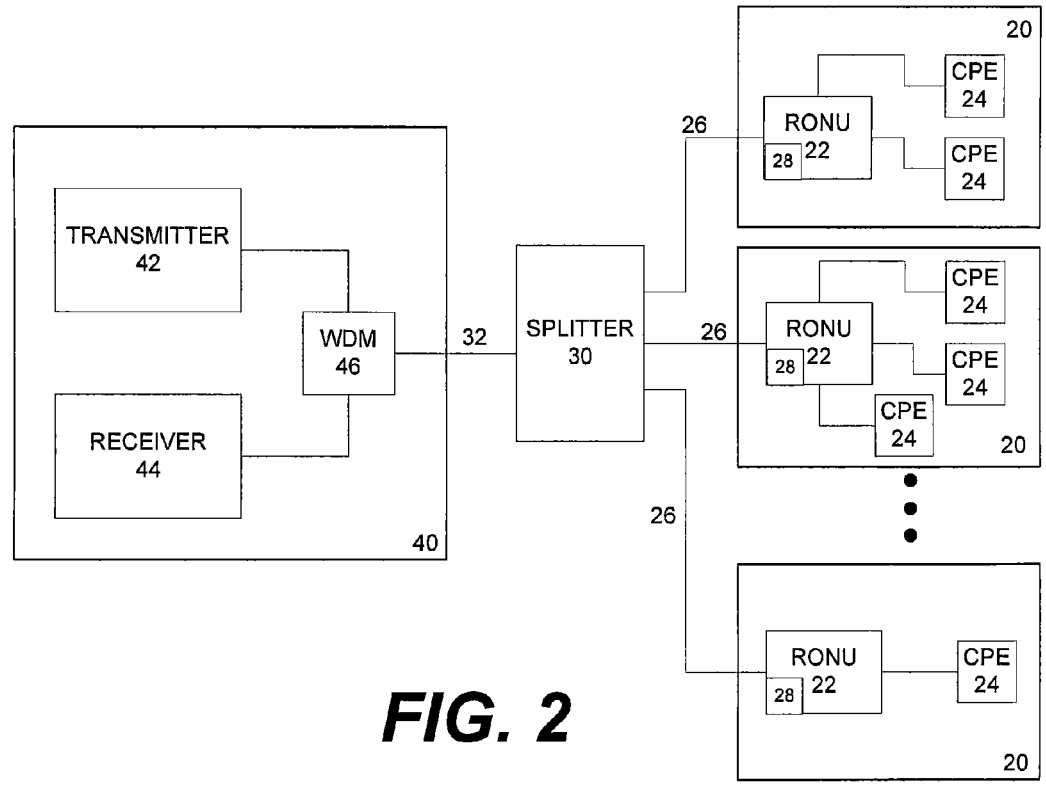
FIG. 2 is a schematic block diagram illustrating an RFoG network according to embodiments of the present invention in which polarization control is performed at the RONUs.
Figure 3:
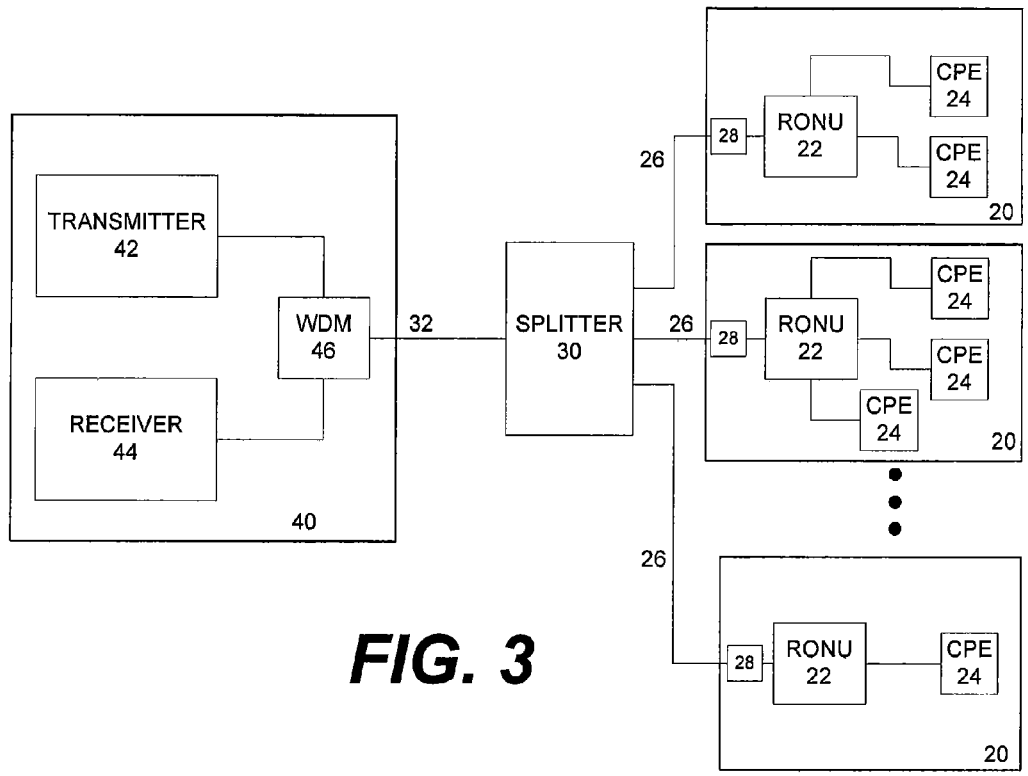
FIG. 3 is a schematic block diagram illustrating an RFoG network according to embodiments of the present invention in which polarization control is performed at the customer premises external to the RONUs.
Figure 4:
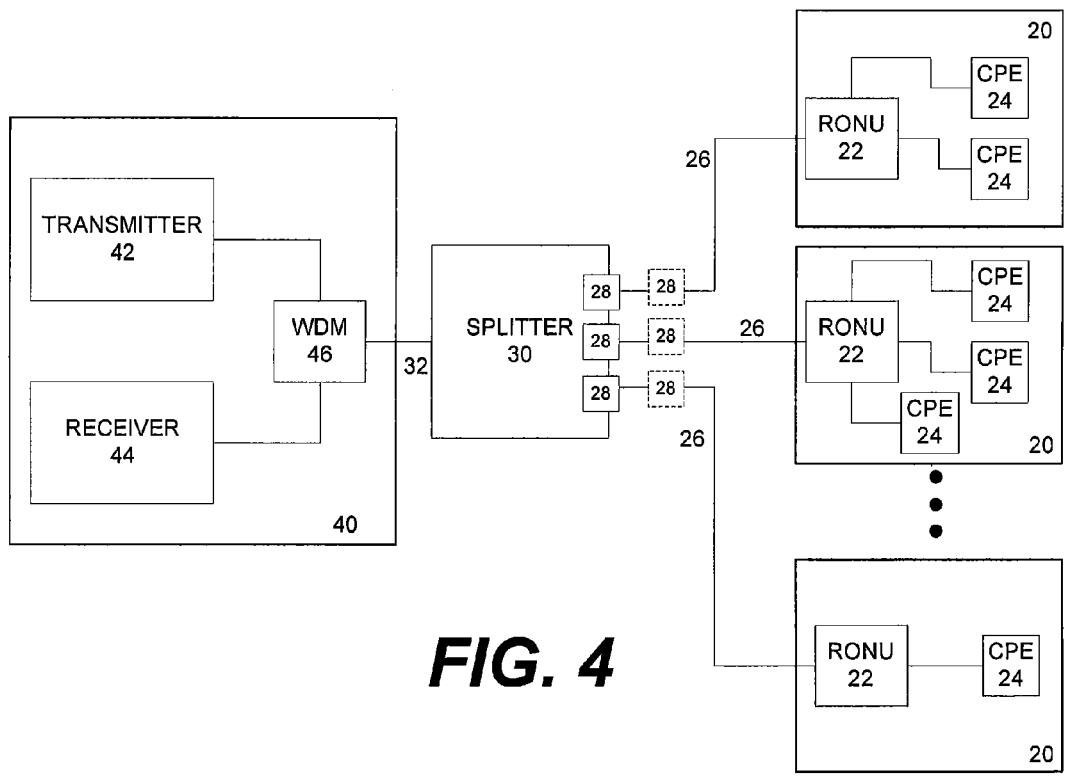
FIG. 4 is a schematic block diagram illustrating an RFoG network according to embodiments of the present invention in which polarization control is performed at an optical splitter/combiner.

The polarization state of the optical signals may be set to a desired state at a variety of different locations within the RFoG network 10. For example, FIG. 2 illustrates an embodiment in which the laser at each of the RONUs 22 generates an optical signal having a desired polarization state. The laser in each RONU 22 may generate an optical signal having the desired polarization state or, alternatively, as shown in FIG. 2, a polarization converter 28 may be included within each RONU 22 that converts the optical signal that is emitted by the respective lasers to the desired polarization state(s). FIG. 3 illustrates an embodiment in which a polarization converter 28 is provided within each customer premise 20 that converts the polarization state of the optical signal that is transmitted by the laser at the RONU 22 to a desired polarization state. The polarization converter 28 may be, for example, a stand-alone device or a device that is incorporated into other equipment in the optical path such as, for example, an optical connector. As shown in FIG. 4, in still further embodiments, the polarization converters 28 may be integrated into the splitter/combiner 30 or may be provided along the optical fibers 26. Integration of the polarization converters 28 into the splitter/combiner 30 may be advantageous as it may eliminate any need to stock different components or to track the types of polarization converters used at the RONUs 22. In yet further embodiments, polarization converters 28 may be located between the splitter/combiner 30 and the optical receiver 44.

The polarization converters 28 may be implemented in a variety of different ways. For example, in some embodiments, the polarization converters 28 may comprise filters that only allow certain polarization states to pass therethrough. In other embodiments, the optical transmission path may be varied in a way that adjusts the polarization of optical signals that are transmitted therethrough. Any appropriate technique may be used to adjust the polarization state of the optical signals to a desired state.

Thus, pursuant to embodiments of the present invention, a plurality of optical network units 22 may communicate with a shared receiver 44 over respective optical transmission paths 26/32 that include a shared optical fiber 32. A first of the optical network units 22 may transmit a first optical signal to the receiver 44 over a first optical transmission path 26/32 so that the first optical signal has a first polarization state when transmitted over the shared optical fiber 32. The first optical signal may be set to the first polarization state when transmitted from the first optical network unit 22 or may be set to the first polarization state elsewhere along the first optical transmission path such as, for example, at an optical splitter/combiner 30. A second of the optical network units 22 may transmit a second optical signal to the receiver 44 over a second optical transmission path 26/32 so that the second optical signal has a second polarization state when transmitted over the shared optical fiber 32. The second optical signal may be set to the second polarization state when transmitted from the second optical network unit 22 or may be set to the second polarization state elsewhere along the second optical transmission path such as, for example, at the optical splitter/combiner 30. The second polarization state may be angularly separated from the first polarization state by at least about 120 degrees.

In some embodiments, all of the optical network units 22 that communicate with the shared receiver 44 may transmit signals having either the first polarization state or the second polarization state. In such embodiments, the first polarization state may be substantially orthogonal to the second polarization state (i.e., the first polarization state may be angularly separated from the second polarization state by approximately 180 degrees). In other embodiments, the optical network units 22 that communicate with the shared receiver 44 may each be assigned one of N different polarization states, where N>2. In such embodiments, each of the N polarization states may be angularly separated from each of the other polarization states by approximately the same amount. In example embodiments, N may be 3, 4 or 5. When N=3, each of the three polarization states may be angularly separated from the other two polarization states by approximately 120 degrees. When N=4, each of the four polarization states may be angularly separated from the other three polarization states by approximately 90 degrees. When N=5, each of the five polarization states may be angularly separated from the other four polarization states by approximately 72 degrees.

Typically, the lasers that are included in each of the optical network units will all be designed to transmit optical signals at the same nominal wavelength such as, for example, 1610 nm at a specified temperature (e.g., 25° C.). Due to manufacturing variation, the actual operating wavelengths of the lasers at the specified temperature will vary somewhat from the deigned wavelength. Such variation is typically less than +/−1.5 nm. It will be appreciated, however, that in other embodiments the lasers that communicate with the common receiver may be intentionally selected and/or tuned to have a range of different wavelengths about the nominal wavelength in order to increase the wavelength separation between the lasers at the specified temperature as a means of reducing optical beat interference.

In some embodiments, a first temperature control system that is associated with the first optical network unit may be used to control a temperature of a first laser that is included in the first optical network unit according to a first algorithm, and a second temperature control system that is associated with the second optical network unit may be used to control a temperature of a second laser that is included in the second optical network unit according to a second algorithm that is different than the first algorithm. A variety of different algorithms may be used. For example, in some embodiments, the first algorithm may set the operating temperature of the first laser to a first temperature value and the second algorithm may set the operating temperature of the second laser to a second temperature value that is different from the first value. The first temperature value may be at a first offset from a selected base temperature (e.g., 25° C.) and the second temperature value may be at a second temperature offset from the base temperature. The first and second temperature offsets may be deliberately or randomly selected. In an example embodiment, each of the first and second temperature offsets may be in the range of +/−10° C. from the base temperature. By using such temperature offsets, the wavelength separation between the lasers at the specified temperature may be further increased. In some embodiments, the first algorithm may additionally vary the temperature of the first laser about the first temperature value and the second algorithm may additionally vary the temperature of the second laser about the second temperature value. Such variation may be performed continuously as discussed in the '263 application or may be done discretely as discussed in the '704 patent.

It will be appreciated that optical network units may also be referred to as network interface units ("NIUs"), RFoG optical network units ("RONUs") and optical network terminals ("ONTs"). There may be minor differences between these devices in construction or application which is why they may be referred to using these different names. As used herein, the term optical network unit will be used to generically refer to RONUs, NIUs and ONTs.

The present invention has been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of reducing optical beat interference in a fiber optic network in which a first optical network unit and a second optical network unit communicate with a shared receiver over respective first and second optical transmission paths that both include a shared optical fiber, the method comprising:
   transmitting a first optical signal from the first optical network unit to the receiver over the first optical transmission path where the first optical signal has a first polarization state when transmitted over the shared optical fiber;
   transmitting a second optical signal from the second optical network unit to the receiver over the second optical transmission path where the second optical signal has a second polarization state when transmitted over the shared optical fiber, the second polarization state being angularly separated from the first polarization state by at least about 120 degrees;
   using a first temperature control system of the first optical network unit to vary a temperature of a first laser that is included in the first optical network unit according to a first algorithm to change the wavelength of the first optical signal continuously or discretely; and
   using a second temperature control system of the second optical network unit to vary a temperature of a second laser that is included in the second optical network unit according to a second algorithm that is different than the first algorithm to change the wavelength of the second optical signal continuously or discretely.

2. The method of claim 1, wherein the first polarization state is substantially orthogonal to the second polarization state.

3. The method of claim 1, further comprising:
   transmitting a third optical signal from a third optical network unit to the receiver over a third optical transmission path that includes the shared optical fiber, where the third optical signal has a third polarization state when transmitted over the shared optical fiber, the third polarization state being angularly separated from both the first polarization state and the second polarization state by at least about 120 degrees.

4. The method of claim 1, wherein the first and second polarization states are pre-selected in order to reduce optical beat interference.

5. The method of claim 1, wherein the first and second optical signals are set to the respective first and second polarization states at an optical splitter.

6. The method of claim 1, wherein the first algorithm sets the temperature of the first laser to a first predefined base temperature and the second algorithm sets the temperature of the second laser to a second predefined base temperature that is different than the first base temperature.

7. The method of claim 6, wherein the first algorithm further varies the temperature of the first laser about the first predefined base temperature and the second algorithm further varies the temperature of the second laser about the second predefined base temperature.

8. The method of claim 1, wherein the first algorithm automatically varies the temperature of the first laser according to a first continuous function and the second algorithm automatically varies the temperature of the second laser according to a second continuous function that is different from the first continuous function.

9. The method of claim 1, wherein the first optical transmission path includes at least a first optical fiber that connects the first optical network unit to an optical splitter/combiner and the shared optical fiber that is interposed between the optical splitter/combiner and the receiver, and the second optical transmission path includes at least a second optical fiber that connects the second optical network unit to the optical splitter/combiner and the shared optical fiber.

* * * * *